United States Patent
Koyama et al.

US 6,300,426 B1

(10) Patent No.: US 6,300,426 B1
(45) Date of Patent: Oct. 9, 2001

(54) SILICONE COMPOSITION FOR FORMING CURED RELEASE FILMS

(75) Inventors: Taku Koyama; Atsushi Togashi; Takateru Yamada, all of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/444,357

(22) Filed: Nov. 18, 1999

(30) Foreign Application Priority Data

Nov. 25, 1998 (JP) .................................................. 10-334222

(51) Int. Cl.$^7$ .............................. C08L 83/05; C08G 77/12
(52) U.S. Cl. .............................. 525/477; 528/15; 528/32; 528/31
(58) Field of Search ................................. 528/15, 32, 31; 525/477

(56) References Cited

U.S. PATENT DOCUMENTS

| 4,609,574 | 9/1986 | Keryk et al. .......................... 427/407 |
| 5,064,916 | 11/1991 | Sasaki et al. .......................... 525/478 |
| 5,635,577 | * 6/1997 | O'Brien . |

FOREIGN PATENT DOCUMENTS

| 2-145649 | 6/1990 | (JP) . |
| 2-187466 | 7/1990 | (JP) . |
| 7-258606 | 10/1995 | (JP) . |
| 9-125004 | 5/1997 | (JP) . |
| 10-158519 | 6/1998 | (JP) . |

OTHER PUBLICATIONS

Chemical abstracts, vol. 127, No. 6, Aug. 11, 197, Takateru Yamada, Atsushi Togashi, "Peelable, Hard Film–Forming and Migration Resistant Silicone Compositions." Abstract 82901, p. 842.

* cited by examiner

Primary Examiner—Robert Dawson
Assistant Examiner—Kuo-Liang Peng
(74) Attorney, Agent, or Firm—Timothy J. Troy; Patricia M. Scaduto

(57) ABSTRACT

This invention relates to a silicone composition comprising: (A) a mixture of (i) a linear trimethylsiloxy-terminated polydiorganosiloxane containing at least 2 alkenyl groups having at least 4 carbon atoms and (ii) optionally a linear dimethylalkenylsiloxy-terminated polydiorganosiloxane, (B) a polyorganohydrogensiloxane, (C) a catalytic quantity of a platinum catalyst, and (D) an inhibitor. The silicone compositions of this invention make it possible to form cured release films with low resistance to peeling when peeling is carried out at high speeds, and with the possibility of controlling the resistance to peeling between low and high values when peeling is carried out at low speeds. The silicone compositions of this invention also are not subject to a decrease in the coefficient of residual adhesion in the adhesive material applied onto a cured release film.

20 Claims, No Drawings

SILICONE COMPOSITION FOR FORMING CURED RELEASE FILMS

FIELD OF THE INVENTION

The present invention relates to a solventless silicone composition intended for forming cured release films. More specifically, the invention relates to a silicone composition which, through the use of a cured organopolysiloxane film, imparts to the surfaces of various substrates, such as paper, synthetic resin film, or metal foil, release properties relative to tacky substances.

BACKGROUND OF THE INVENTION

Solventless silicone compositions are used as release liners of adhesive tapes and sheets for forming, cured films with an ability to release from adhesive substances. When these release films are peeled with low speed (below approximately 0.3 m/min), resistance to peeling is allowed in a wide range from low to high. However, when peeling is carried out with a high speed (50 m/min or higher), it is required that resistance to peeling be relatively low. Japanese Patent Application No. 2-187466 discloses a solventless silicone release coating composition prepared from an polyorganohydrogensiloxane, a platinum catalyst, and a mixture of polydiorganosiloxanes comprising a copolymer of dimethylsiloxane and methylvinylsiloxane and a copolymer of diphenylsiloxane, methylvinylsiloxane, and dimethylsiloxane with diphenylsiloxane units in an amount of 0.5 to 3.0 mole %. A drawback of this composition is high resistance to peeling and a decrease in residual adhesion of the adhesive material that has been applied onto the cured release film. For these reasons, the above composition was not always satisfactory in use. In Japanese Patent Application Nos. 9-125004, 10-158519, and 2-145649, is disclosed a composition comprising an uncured copolymer of methylhexenylsiloxane and dimethylsiloxane having both molecular terminals capped with trimethylsilyoxy groups, a polyorganohydrogensiloxane, a platinum catalyst, and an organic solvent. Since the main component of this composition is a polydiorganosiloxane having hexenyl groups and comprising a rubber-like high-molecular-weight substance, it is required that the composition be diluted in an organic solvent. llowever, organic solvents not only are harmful to the health of the workers who work with such solvents, but also are costly since they require the use of various means to prevent evaporation of these solvents into the surrounding atmosphere. In addition, the use of the cured films produced from the aforementioned compositions is not always satisfactory. This is because, when peeling is carried out at high speed (exceeding approximately 50 m/min), it is difficult to ensure low resistance to peeling.

In Japanese Patent Application No. 7-258606 it was proposed to utilize solventless silicone release coating composition having a main component in the form of polyorganosiloxane having both molecular terminals capped with trialkylsiloxy groups and with two or more vinyl groups in a side chain. In Japanese Patent Publication 62-86061 was disclosed a silicone release coating composition having as its main component a polydiorganosiloxane having alkenyl groups containing 6 or more carbon atoms in one molecule. Although the aforementioned compositions are free of problems associated with the use of organic solvents and are not subject to decrease in the coefficient of residual adhesion in the adhesive material applied onto the cured release films, they still have high resistance to peeling when peeling is performed at a high speed (approximately 50 m/min or higher).

SUMMARY OF THE INVENTION

This invention relates to a silicone composition comprising: (A) a mixture of (i) a linear trimethylsiloxy-terminated polydiorganosiloxane containing at least 2 alkenyl groups having at least 4 carbon atoms and (ii) optionally a linear dimethylalkenylsiloxy-terminated polydiorganosiloxane, (B) a polyorganohydrogensiloxane, (C) a catalytic quantity of a platinum catalyst, and (D) an inhibitor.

It is an object of this invention to provide a solventless silicone release coating composition which makes it possible to form cured release films with low resistance to peeling when peeling is carried out at high speeds, and With the possibility of controlling the resistance to peeling between low and high values when peeling is carried out at low speeds.

It is also an object of this invention to produce a solventless silicone release coating composition which is not subject to a decrease in the coefficient of residual adhesion in the adhesive material applied onto a cured release film.

DETAILED DESCRIPTION OF THE INVENTION

This invention relates to a silicone composition comprising: (A) a mixture of (i) 40 to 100 wt % of a linear trimethylsiloxy-terminated polydiorganosiloxane having a viscosity of 50 to 5000 $mm^2/s$ at 25° C. and containing at least 2 alkenyl groups having at least 4 carbon atoms, the alkenyl groups comprising 0.2 to 10.0 mole % of all organic groups bonded to silicon atoms in the polydiorganosiloxane, and (ii) 0 to 60 wt % of a linear dimethylalkenylsiloxy-terminated polydiorganosiloxane having a viscosity of 50 to 5000 $mm^2/s$ at 25° C. and containing at least 2 alkenyl groups per molecule, the alkenyl groups comprising 0.2 to 10.0 mole % of all organic groups bonded to silicon atoms in the polydiorganosiloxane, (B) 3 to 50 parts by weight per 100 parts by weight of Component (A) of a polyorganohydrogensiloxane having at least 3 silicon-bonded hydrogen atoms per molecule and having a viscosity of 1 to 1000 $mm^2/s$ at 25° C., (C) a catalytic quantity of a platinum catalyst, and (D) an inhibitor.

The polydiorganosiloxane of Component A(i) is a linear-chain siloxane which is terminated with trimethylsiloxy groups and which contains in its side chain at least 2 alkenyl groups having 4 or more carbon atoms. Normally, the alkenyl group is bonded to a silicon atom. The alkenyl groups are exemplified by butenyl, 5-hexenyl, octenyl, and decenyl. It is preferred that the alkenyl group is the 5-hexenyl group. It is recommended that the alkenyl groups comprise 0.2 to 10 mole %, preferably 1.0 to 5.0 mole % of the total amount of organic groups bonded to silicon atoms in the polydiorganosiloxane. Silicon-bonded organic groups other than alkenyl groups are exemplified by monovalent hydrocarbon groups such as alkyl groups exemplified by methyl, ethyl, propyl, butyl, pentyl, and hexyl, aryl groups exemplified by phenyl, tolyl, and xylyl, aralkyl groups such as benzyl and phenethyl, with methyl being preferred. The polydiorganosiloxane of Component A(i) preferably is a trimethylsiloxy-terminated polydimethylsiloxane-polymethylalkenylsiloxane copolymer represented by the formula:

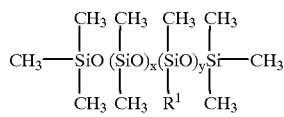

wherein $R^1$ is an alkenyl group having 4 or more carbon atoms, x and y are positive integers which satisfy the following conditions: $0.80 \leq x/(x+y) < 0.99$; $0.01 < y/(x+y) \leq 0.20$ and $y \leq 2$. If $y/(x+y)$ is below 0.01, in the case of high-speed peeling, the resistance to peeling will be high. If, on the other hand, the above value exceeds 0.20, resistance to peeling will be high at both low- and high-speed peeling. It is preferable that $y/(x+y)$ be within the range of 0.03 to 0.06. Furthermore, $(x+y)$ should have a value that provides viscosity at 25° C. within the range of 50 to 5000 mm²/s, and preferably within the range of 100 to 2000 mm²/s.

The polydiorganosiloxane of Component A(ii) is a linear-chain siloxane which contains at least 2 alkenyl groups in its molecule and which is terminated with dimethylalkenylsiloxy groups. Normally, the alkenyl group is bonded to a silicon atom. The alkenyl groups are exemplified by vinyl, butenyl, 5-hexenyl, octenyl, and decenyl. It is especially preferred that the alkenyl group is selected from the group consisting of vinyl group and 5-hexenyl. It is recommended that the alkenyl groups comprise 0.2 to 10 mole %, preferably 1.0 to 5.0 mole % of the total amount of organic groups bonded to silicon atoms in the polydiorganosiloxane. Silicon-bonded organic groups other than alkenyl groups are exemplified by monovalent hydrocarbon groups such as alkyl groups exemplified by methyl, ethyl, propyl, butyl, pentyl, and hexyl, aryl groups exemplified by phenyl, tolyl, and xylyl, aralkyl groups such as benzyl and phenethyl, with methyl being preferred. The polydiorganosiloxane of Component A(ii) preferably is a dimethylalkenylsiloxy-terminated polydimethylsiloxane-polymethylalkenylsiloxane copolymer having the formula:

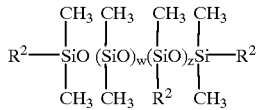

wherein $R^2$ is an alkenyl group, w and z are equal to 0 or represent positive integers which satisfy the following conditions: $0.80 \leq w/(w+z)$ and $z/(w+z) \leq 0.20$. If $z/(w+z)$ exceeds 0.20, resistance to peeling will be high at both low- and high-speed peeling. It is preferable that $z/(w+z)$ be within the range of 0.01 to 0.06. Furthermore, $(w+z)$ should have a value that provides viscosity at 25° C. within the range of 50 to 5000 mm²/s, and preferably within the range of 100 to 2000 mm²/s.

If the share of Component A(ii) in a mixture of the above Components A(i) and A(ii) is reduced, resistance to peeling at high peeling speeds will grow. Therefore it is required that Component A(i) and Component A(ii) be mixed in a ratio of 40 to 100 wt %: 60 to 0 wt %, preferably in a ratio of 50 to 100 wt %: 50 to 0 wt % and even more preferably in a ratio of 50 to 80 wt %: 50 to 21) wt %. Component (A) may contain Component A(i) alone, or A(i) in a mixture with Component A(ii). It is recommended, however, that the viscosity of Component (A) at 25° C. be below 5000 mm²/s and preferably be within the range of 100 to 2000 mm²/s.

The polyorganohydrogensiloxane of Component (B) is used in the composition of the present invention as a cross-linking agent. This Component contains in one molecule at least three silicon-bonded hydrogen atoms. There are no limitations, however, with regard to the positions of the bonds. Examples of organic groups other than hydrogen atoms, which are bonded to silicon atoms, are monovalent hydrocarbon groups without aliphatic unsaturated bonds such as alkyl groups exemplified by methyl, ethyl, propyl, butyl, pentyl, and hexyl, aryl groups exemplified by phenyl, tolyl, and xylyl, aralkyl groups such as benzyl and phenethyl, with methyl being preferred. The polyorganohydrogensiloxane can be a linear, cyclic, branched, or resin-like molecular structure. Preferably, Component (B) is a trimethylsiloxy-terminated polydimethylsiloxane-polymethylhydrogensiloxane copolymer having a viscosity at 25° C. within the range of 1 to 1000 mm²/s. It is recommended that this Component be used in an amount of 3 to 50 parts by weight against 100 parts by weight of Component (A). This is because, if it is contained in an amount less than 3 parts by weight, the composition of the invention can not be sufficiently cured, and if it is contained in an amount exceeding 50 parts by weight, the resistance of the cured release film to peeling will change with the passage of time.

The platinum catalyst of Component (C) used in he composition of the present invention is a catalyst utilized for accelerating curing of the composition. The catalyst (C) is exemplified by platinum black, platinum-carrying silica, and platinum-carrying activated carbon, chloroplatinic acid, an alcohol solution of a chloroplatinic acid, a complex of a chloroplatinic acid and an olefin, and a complex of a chloroplatinic acid and divinyltetramethyldisiloxane. It is recommended that the above compounds be used in a catalytic quantity, preferably in an amount of 1 to 1000 ppm against the total amount of Components (A) and (B).

Component (D), the inhibitor is utilized to prevent the cure of the coating from occurring below a predetermined temperature. While an inhibitor is not essential to the functioning of the coating itself it is to be understood that without the presence of an inhibitor the catalyst may initiate/catalyze the cure of the silicone composition at ambient temperature.

The inhibitor (D) can be any material that is known to be, or can be, used to inhibit the catalytic activity of platinum group metal-containing catalysts. By the term "inhibitor" it is meant herein a material that retards the room temperature curing of a curable mixture of an alkenyl functional polyorganosiloxane, an organohydrogensiloxane and a platinum catalyst, when incorporated therein in small amounts, such as less than 10 parts by weight of the composition, without preventing the elevated temperature curing of the mixture. Examples of suitable classes of inhibitors include ethylenically or aromatically unsaturated amides, acetylenic compounds including acetylenic alcohols and silylated acetylenic alcohols, ethylenically unsaturated isocyanates, olefinic siloxanes, unsaturated hydrocarbon diesters, conjugated ene-ynes, olefinic cyclosiloxanes, hydroperoxides, nitriles, and diaziridines.

Preferred inhibitors are exemplified by acetylenic alcohols exemplified by 1-ethynyl-1-cyclohexanol, 3-methyl-1-butyn-3-ol (methylbutynol), 3-phenyl-1-butyn-3-ol (phenylbutynol), 2-ethynyl-isopropanol, 2-ethynyl-butane-2-ol, and 3,5-dimethyl-1-hexyn-3-ol, silylated acetylenic alcohols exemplified by trimethyl(3,5-dimethyl-1-hexyn-3-oxy)silane, dimethyl-bis-(3-methyl-1-butyn-3-oxy)silane, methylvinylbis(3-methyl-1-butyn-3-oxy)sil ane, and ((1,1- dimethyl-2-propynyl)oxy)trimethylsilane, unsaturated carboxylic esters exemplified by diallyl maleate, dimethyl maleate, diethyl fumarate, diallyl fumarate, and bis(2-methoxy-1-methylethyl) malcate, conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne, vinylcyclosiloxanes such is 1,3,5,7-tetramethyl-1,3,5,7-tetravinylcyclotetrasiloxane, a mixture comprising a conjugated ene-yne and a vinylcyclosiloxane, a mixture comprising a vinylcyclosiloxane and an acetylenic alcohol, and a mixture comprising an unsaturated carboxylic ester and an alcohol exemplified by benzyl alcohol and 1-octanol.

The amount of inhibitor to be used in the silicone compositions of this invention is not critical and can be any amount that will retard the reaction between Components (A) and (B) initiated by the presence of catalyst (C) while not preventing this reaction at elevated temperatures. No specific amount of inhibitor can be suggested to obtain a specified pot life at room temperature since the desired amount of any particular inhibitor will depend on the type of platinum catalyst (C) which is used, the nature and amounts of ingredients (A), (B), and (C) and the presence or absence of optional ingredients. The affinity of a particular inhibitor for platinum also has to be considered when selecting a molar ratio of inhibitor to platinum and can be determined by routine experimentation. However, it is preferred that from 0.1 to 10 parts by weight of inhibitor be used, and it is highly preferred that from 0.5 to 5 parts by weight of inhibitor be employed per 100 parts by weight of Component (A).

The composition of the present invention is prepared by combining Components (A) through (D) and any optional ingredients. If necessary, however, other known additives used in conjunction with solventless silicone release coating compositions such as curing delaying agents, fine powder silica, or other inorganic fillers, as well as pigments, heat-resistive additives, organic resin powder, and dyes can be used in amounts that do not preclude achieving the objects of the present invention. From the point of view of spreadability, it is recommended that the viscosity of the composition of the invention at 25° C. be within the range of 50 to 5000 mm²/s, preferably of 100 to 2000 mm²/s.

The composition of this invention can be prepared by merely uniformly mixing Components (A) through (D) and any optional ingredients. Preferably, the platinum catalyst of Component (C) should be added and mixed after premixing Components (A), (B), and (D).

The silicone compositions of this invention can be applied onto the surfaces of various substrates such as various types of paper, laminated paper, synthetic resin film, and metal foil, and cured to form release films capable of releasing from tacky substances on the surfaces of these substrates. Such films can be used as release liners or release coatings. Since this composition does not contain organic solvents, it is advantageous in that it does not pollute the environment and in that it improves industrial conditions. Another advantage is low resistance to high-speed peeling (i.e., peeling with a speed exceeding approximately 50 m/min) and the possibility of controlling resistance to peeling at low peeling speeds (i.e., below approximately 0.3 m/min). This is achieved by varying a ratio of Components (A) and (B).

EXAMPLES

The invention will be further described in detail with reference to practical examples. The viscosity used in these examples has values measured at 25° C. Furthermore, resistance to peeling of the cured film made from the release film-forming silicone composition, migration of silicone, and a coefficient of residual adhesion of the tacky substance (%) were determined by the methods described below:

Resistance to Peeling

An amount of silicone composition was applied onto the surface of paper, and then a cured coating film was formed. An acryl-type adhesive agent (Oribine BPS5127 from Toyo Ink Co., Ltd.) was applied onto the film, and the product was heat treated and dried for 2 minutes (min.) at 70° C. Paper was then placed onto the treated surface and maintained on it for 24 hours under a pressure of 20 g/cm² at a temperature of 25° C. and at a 60% humidity. With the use of a Tensilon tester and a high-speed peeling tester, the attached paper was pulled at an angle of 180° and at different tension rates of 0.3 m/min., 50 m/min., and 100 m/min., and the force (gf) required for peeling was measured. All samples had a width of 2.5 cm.

Migration of Silicone

An amount of silicone composition was applied onto the surface of paper and formed into a cured film to produce release paper. A clean polyester film was applied onto the surface of the release film, a 100 kg/cm² pressure was applied by press to the release film, and the coated object was maintained under such conditions for 30 min. at 25° C. The polyester film was then peeled off, lines were drawn by Magic Ink™ on the surface of contact of the polyester film with the release paper, and the degree of cissing of the ink was evaluated. If the ink was not subject to cissing, the silicone was considered to not have migrated. If the ink was subject to cissing, the silicone was considered to have migrated.

Coefficient of Residual Adhesion

An amount of silicone composition was applied onto the surface of paper and cured into a film. An adhesive tape (Nitto Polyester Adhesive Tape 31B from Nitto Denko Co., Ltd.) was applied onto the surface of the cured film, a 20 g/cm² pressure was developed, and aging was carried out for 20 hours at 70° C. The adhesive tape was then peeled off and the released adhesive tape was applied onto a stainless steel plate. After maintaining the object for 30 min. at 25° C. under a 20 g/cm² pressure, the adhesive tape was pulled at an angle of 1800° with a rate of 0.3 m/min. The force (gf) required for peeling was measured. A control test was performed by applying an adhesive tape (Nitto Polyester Adhesive Tape 31B from Nitto Denko Co., Ltd.) in the same manner as described above onto a Teflon sheet, and a force (gf) required for peeling the adhesive tape off was measured in the same manner as above. The measured values were used for calculating the coefficient of residual adhesion (%) by means of the following formula:

$$\text{Coefficient of residual adhesion (\%)} = \frac{\text{Force } (gf) \text{ required for peeling off adhesive tape applied onto cured film of solventless silicone release coating}}{\text{Force } (gf) \text{ required for peeling off adhesive tape applied onto Teflon sheet}} \times 100$$

Example 1

The following components were uniformly mixed: 100 parts by weight of a trimethylsiloxy-terminated polydimethylsiloxane-polymethylhexenylsiloxane copolymer containing 96 mole % dimethylsiloxane units and 4 mole % methylhexenylsiloxane units and having a viscosity of 370 mm²/s, 11 parts by weight of a trimethylsiloxy-terminated polydimethylsiloxane-polymethylhydrogensiloxane copolymer containing 30 mole % dimethylsiloxane units and 70 mole % methylhydrogensiloxane units and having a viscosity of 20 mm²/s, and 0.3 parts by weight of 1-ethynyl-1-cyclohexanol. This mixture was then combined with a complex salt of a chloroplatinic acid and methylvinylsiloxane added in an amount that contained 200 ppm of platinum metal. As a result, a silicone composition having a viscosity of 330 mm²/s was prepared. The silicone composition was spread over the surface of polyethylene laminate paper in an amount of about 1.0 g/m², and then a cured film was formed by heat-treating for 20 seconds at 130° C. The cured film was tested with regard to resistance to peeling, silicone migration, and coefficient of residual adhesion. The results of the measurements are shown in Table 1.

Comparative Example 1

A silicone composition having a viscosity of 330 mm²/s was prepared by the same method as in Example 1, with the exception that a trimethylsiloxy-terminated polydimethylsiloxane-polymethylvinylsiloxane copolymer containing 96 mole % dimethylsiloxane units and 4 mole % methylvinylsiloxane units and having a viscosity of 370 mm²/s was used instead of the trimethylsiloxy-terminated polydimethylsiloxane-polymethylhexenylsiloxane copolymer used in Example 1. The silicone composition was spread over the surface of polyethylene laminate paper in an amount of about 1.0 g/m², and then a cured film was formed by heating for 20 seconds at 130° C. The cured film was tested with regard to resistance to peeling, silicone migration, and the coefficient of residual adhesion. The results of the measurements are shown in Table 1.

Comparative Example 2

A silicone composition having a viscosity of 330 mm²/s was prepared by the same method as in Example 1, with the exception that a dimethylhexenylsiloxy-terminated polydimethylsiloxane-polymethylhexenylsiloxane copolymer containing 96 mole % dimethylsiloxane units and 4 mole % methylhexenylsiloxane units and having a viscosity of 370 mm²/s was used instead of the trimethylsiloxy-terminated polydimethylsiloxane-polymethylhexenylsiloxane copolymer used in Example 1. The silicone composition was spread over the surface of pole ethylene laminate paper in an amount of about 1.0 g/m², and then a cured film was formed by heating for 20 seconds at 130° C. The cured film was tested with regard to resistance to peeling, silicone migration, and the coefficient of residual adhesion. The results of the measurements are shown in Table 1.

Comparative Example 3

A silicone composition having a viscosity of 350 mm²/s was prepared by the same method as in Example 1, with the exception that a dimethylvinylsiloxy-terminated polydimethylsiloxane-polymethylvinylsiloxane copolymer containing 96 mole % dimethylsiloxane units and 4 mole % methylvinylsiloxane units and having a viscosity of 400 mm²/s was used instead of the trimethylsiloxy-terminated polydimethylsiloxane-polymethylhexenylsiloxane copolymer used in Example 1. The silicone composition was spread over the surface of polyethylene laminate paper in an amount of about 1.0 g/m², and then a cured film was formed by heating for 20 seconds at 130° C. The cured film was tested with regard to resistance to peeling, silicone nigration, and the coefficient of residual adhesion. The results of the measurements are shown in Table 1.

Example 2

The following components were uniformly mixed: 100 parts by weight of a trimethylsiloxy-terminated polydimethylsiloxane-polymethylhexenylsiloxane copolymer containing 95 mole % dimethylsiloxane units and 5 mole % methylhexenylsiloxane units and having a viscosity of 200 mm²/s, 10 parts by weight of a trimethylsiloxy-terminated polydimethylsiloxane-polymethylhydrogensiloxane copolymer containing 30 mole % dimethylsiloxane units and 70 mole % methylhydrogensiloxane units and having a viscosity of 70 mm²/s, and 0.3 parts by weight of 3-methyl-1-butyn-3-ol. The mixture was then combined with a complex salt of a chloroplatinic acid and methylvinylsiloxane added in an amount that contained 200 ppm of metal platinum. As a result, a silicone composition having a viscosity of 160 mm²/s was prepared. The silicone composition was spread over the surface of polyethylene laminate paper in an amount of about 1.0 g/m², and then a cured film was formed by heating for 20 seconds at 130° C. The cured film was tested with regard to resistance to peeling, silicone migration, and the coefficient of residual adhesion. The results of the measurements are shown in Table 1.

Example 3

The following components were uniformly mixed: 50 parts by weight of a trimethylsiloxy-terminated polydimethylsiloxane-polymethylhexenylsiloxane copolymer containing 96 mole % dimethylsiloxane units and 4 mole % methylhexenylsiloxane units and having a viscosity of 370 mm²/s, 50 parts by weight of a dimethylhexenylsiloxy-terminated polydimethylsiloxane-polymethylhexenylsiloxane copolymer containing 98.0 mole % dimethylsiloxane units and 2.0 mole % methylhexenylsiloxane units and having a viscosity of 190 mm²/s, 11 parts by weight of a trimethylsiloxy-terminated polydimethylsiloxane-polymethylhydrogensiloxane copolymer containing 30 mole % dimethylsiloxane units and 70 mole % methylhydrogensiloxane units and having a viscosity of 70 mm²/s, and 0.3 parts by weight of 1-ethynyl-1-cyclohexenol. The mixture was then combined with a complex salt of a chloroplatinic acid and methylvinylsiloxane added in an amount that contained 200 ppm of metal platinum. As a result, a silicone composition having a viscosity of 250 mm²/s was prepared. The silicone composition was spread over the surface of polyethylene laminate paper in an amount of about 1.0 g/m², and then a cured film was formed by heating for 20 seconds at 130° C. The cured film was tested with regard to resistance to peeling, silicone migration, and the coefficient of residual adhesion. The results of the measurements are shown in Table 1.

Example 4

The following components were uniformly mixed: 50 parts by weight of a trimethylsiloxy-terminated polydimethylsiloxane-polymethylhexenylsiloxane copolymer containing 96 mole % dimethylsiloxane units and 4 mole % methylhexenylsiloxane units having a viscosity of 370 mm²/s, 50 parts by weight of dimethylvinylsiloxy-terminated polydimethylsiloxane-polymethylvinylsiloxane copolymer containing 98.0 mole % dimethylsiloxane units and 2.0 mole % methylvinylsiloxane units and having a viscosity of 190 mm$^2$/s, 15 parts by weight of a trimethylsiloxy-terminated polydimethylsiloxane-polymethylhydrogensiloxane copolymer containing 30 mole % dimethylsiloxane units and 70 mole % methylhydrogensiloxane units and having a viscosity of 70 mm$^2$/s, and 0.3 parts by weight of 1-ethynyl-1-cyclohexenol. The mixture was then combined with a 3 wt. % isopropyl alcohol solution of a chloroplatinic acid added in an amount that contained 200 ppm of metal platinum. As a result, a silicone composition having a viscosity of 250 mm$^2$/s was prepared. The silicone composition was spread over the surface of polyethylene laminate paper in an amount of about 1.0 g/m$^2$, and then a cured film was formed by heating for 20 seconds at 130° C. The cured film was tested with regard to resistance to peeling, silicone migration, and the coefficient of residual adhesion. The results of the measurements are shown in Table 1.

Comparative Example 4

The following components were uniformly mixed: 30 parts by weight of a trimethylsiloxy-terminated polydimethylsiloxane-polymethylhexenylsiloxane copolymer containing 96 mole % dimethylsiloxane units and 4 mole % methylhexenylsiloxane units and having a viscosity of 370 mm$^2$/s, 70 parts by weight of dimethylhexenylsiloxy-terminated polydimethylsiloxane-polymethylhexenylsiloxane copolymer containing 98.0 mole % dimethylsiloxane units and 2.0 mole % methylhexenylsiloxane units and having a viscosity of 190 mm$^2$/s, 11 parts by weight of a trimethylsiloxy-terminated polydimethylsiloxane-polymethylhydrogensiloxane copolymer containing 30 mole % dimethylsiloxane units and 70 mole % methylhydrogensiloxane units and having a viscosity of 70 mm$^2$/s, and 0.3 parts by weight of 1-ethynyl-1-cyclohexenol. The mixture was then combined with a complex salt of a chloroplatinic acid and methylvinylsiloxane added in an amount that contained 200 ppm of metal platinum. As a result, a silicone composition having a viscosity of 230 mm$^2$/s was prepared. The silicone composition was spread over the surface of polyethylene laminate paper in an amount of about 1.0 g/m$^2$, and then a cured film was formed by heating for 20 seconds at 130° C. The cured film was tested with regard to resistance to peeling, silicone migration, and the coefficient of residual adhesion. The results of the measurements are shown in Table 1.

Comparative Example 5

100 parts by weight of a trimethylsiloxy-terminated polydimethylsiloxane-polymethylhexenylsiloxane copolymer containing 96 mole % dimethylsiloxane units and 4 mole % methylhexenylsiloxane units having a viscosity of 4000 mm$^2$/s in a 30 wt % toluene solution was dissolved in 1460 parts by weight of toluene. Added and uniformly mixed with the obtained solution were 4 parts by weight of a trimethylsiloxy-terminated polymethylhydrogensiloxane polymer and having a viscosity of 25 mm$^2$/s and 1 part by weight of 3-methyl-1-butyn-3-ol. The mixture was then combined with a complex salt of a chloroplatinic acid and methylvinylsiloxane added in an amount that contained 200 ppm of metal platinum. As a result, a silicone composition having a viscosity of 15 mm$^2$/s was prepared. The silicone composition was spread over the surface of polyethylene laminate paper in an amount of about 1.0 g/m$^2$, and then a cured film was formed by heating for 20 seconds at 130° C.

The cured film was tested with regard to resistance to peeling, silicone migration, and the coefficient of residual adhesion. The results of the measurements are shown in Table 1.

TABLE 1

|  | Resistance to Peeling (gf/2.5 cm) | | | Coeff. of residual adhesion | Silicone |
| --- | --- | --- | --- | --- | --- |
|  | 0.3 m/min | 50 m/min | 100 m/min | (%) | migration |
| Example 1 | 12 | 35 | 65 | 98 | None |
| Example 2 | 15 | 40 | 70 | 99 | None |
| Example 3 | 10 | 35 | 55 | 99 | None |
| Example 4 | 35 | 45 | 60 | 99 | None |
| Comparative Example 1 | 34 | 70 | 100 | 94 | None |
| Comparative Example 2 | 26 | 60 | 85 | 98 | None |
| Comparative Example 3 | 28 | 65 | 90 | 98 | None |
| Comparative Example 4 | 30 | 60 | 80 | 96 | None |
| Comparative Example 5 | 27 | 55 | 85 | 94 | None |

That which is claimed is:
1. A silicone composition comprising:
  (A) a mixture of
    (i) 50 to 80 wt % of a linear trimethylsiloxy-terminated polydiorganosiloxane having a viscosity of 50 to 5000 mm$^2$/s at 25° C. and containing at least 2 alkenyl groups having at least 4 carbon atoms, the alkenyl groups comprising 0.2 to 10.0 mole % of all organic groups bonded to silicon atoms in the polydiorganosiloxane; and
    (ii) 20 to 50 wt % of a linear dimethylalkenylsiloxy-terminated polydiorganosiloxane having a viscosity of 50 to 5000 mm$^2$/s at 25° C. and containing at least 2 alkenyl groups per molecule, the alkenyl groups comprising 0.2 to 10.0 mole % of all organic groups bonded to silicon atoms in the polydiorganosiloxane;
  (B) 3 to 50 parts by weight per 100 parts by weight of Component (A) of a polyorganohydrogensiloxane having at least 3 silicon-bonded hydrogen atoms per molecule and having a viscosity of 1 to 1000 mm$^2$/s at 25° C.;
  (C) a catalytic quantity of a platinum catalyst; and
  (D) an inhibitor;
  with the proviso that the silicone composition is solventless.

2. A composition according to claim 1, wherein Component (A)(i) is a trimethylsiloxy-terminated polydimethylsiloxane-polymethylalkenylsiloxane copolymer having the formula:

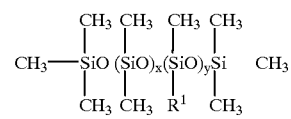

wherein R$^1$ is an alkenyl group having at least 4 carbon atoms, x and y are positive integers with the proviso that $0.80 \leq x/(x+y) < 0.99$, $0.03 < y/(x+y) \leq 0.06$, $y \geq 2$, and the value of (x+y) is such that it provides viscosity at 25° C. of from 100 to 2000 mm$^2$/s.

3. A composition according to claim 2, wherein R$^1$ is 5-hexenyl.

4. A composition according to claim 1, wherein Component A(ii) is a dimethylalkenylsiloxy-terminated polydimethylsiloxane-polymethylalkenylsiloxane copolymer having the formula:

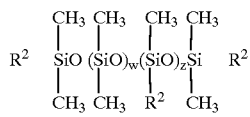

wherein $R^2$ is an alkenyl group, w and z are equal to 0 or represent positive integers with the proviso that $0.80 \leq w/(w+z)$ and $z/(w+z) \leq 0.20$, and with the proviso that the value of (w+z) is such that it provides viscosity at 25° C. of from 100 to 2000 mm²/s.

5. A composition according to claim 2, wherein Component A(ii) is a dimethylalkenylsiloxy-terminated polydimethylsiloxane-polymethylalkenylsiloxane copolymer having the formula:

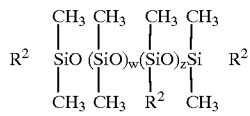

wherein $R^2$ is an alkenyl group, w and z are equal to 0 or represent positive integers with the proviso that $0.80 \leq w/(w+z)$ and $z/(w+z) \leq 0.20$, and with the proviso that the value of (w+z) is such that it provides viscosity at 25° C. of from 100 to 2000 mm²/s.

6. A composition according to claim 3, wherein Component A(ii) is a dimethylalkenylsiloxy-terminated polydimethylsiloxane-polymethylalkenylsiloxane copolymer having the formula:

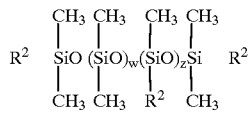

wherein $R^2$ is an alkenyl group, w and z are equal to 0 or represent positive integers with the proviso that $0.80 \leq w/(w+z)$ and $z/(w+z) \leq 0.20$, and with the proviso that the value of (w+z) is such that it provides viscosity at 25° C. of from 100 to 2000 mm²/s.

7. A composition according to claim 4, wherein the value of z/(w+z) is from 0.01 to 0.06 and $R^2$ is selected from the group consisting of vinyl and 5-hexenyl.

8. A composition according to claim 5, wherein the value of z/(w+z) is from 0.01 to 0.06 and $R^2$ is selected from the group consisting of vinyl and 5-hexenyl.

9. A composition according to claim 6, wherein the value of z/(w+z) is from 0.01 to 0.06 and $R^2$ is selected from the group consisting of vinyl and 5-hexenyl.

10. A composition according to claim 3, wherein (B) is a trimethylsiloxy-terminated polydimethylsiloxane-polymethylhydrogensiloxane copolymer having a viscosity at 25° C. of from 1 to 1000 mm²/s.

11. A composition according to claim 8, wherein (B) is a trimethylsiloxy-terminated polydimethylsiloxane-polymethylhydrogensiloxane copolymer having a viscosity at 25° C. of from 1 to 1000 mm²/s.

12. A composition according to claim 9, wherein (B) is a trimethylsiloxy-terminated polydimethylsiloxane-polymethylhydrogensiloxane copolymer having a viscosity at 25° C. of from 1 to 1000 mm²/s.

13. A composition according to claim 10, wherein (C) is selected from the group consisting of chloroplatinic acid, an alcohol solution of chloroplatinic acid, a complex of a chloroplatinic acid and an olefin, and a complex of chloroplatinic acid and divinyltetramethyldisiloxane.

14. A composition according to claim 11, wherein (C) is selected from the group consisting of chloroplatinic acid, an alcohol solution of a chloroplatinic acid, a complex of a chloroplatinic acid and an olefin, and a complex of a chloroplatinic acid and divinyltetramethyldisiloxane.

15. A composition according to claim 12, wherein (C) is selected from the group consisting of chloroplatinic acid, an alcohol solution of a chloroplatinic acid, a complex of a chloroplatinic acid and an olefin, and a complex of a chloroplatinic acid and divinyltetramethyldisiloxane.

16. A composition according to claim 1, wherein (D) is selected from the group consisting of 1-ethynyl-1-cyclohexanol, 3-methyl-1-butyn-3-ol, 3-phenyl-1-butyn-3-ol, 3,5-dimethyl-1-hexyn-3-ol, diallyl maleate, dimethyl maleate, bis(2-methoxy-1-methylethyl) maleate, 3,5-dimethyl-3-hexene-1-yne, 3-methyl-3-pentene-1-yne, 3-methyl-3-hexene-1-yne, 1-ethynylcyclohexene, 3-phenyl-3-butene-1-yne, and 1,3,5,7-tetramethyl-1,3,5,7-tetravinylcyclotetrasiloxane.

17. A composition according to claim 13, wherein (D) is selected from the group consisting of 1-ethynyl-1-cyclohexanol, 3-methyl-1-butyn-3-ol, 3-phenyl-1-butyn-3-ol, 3,5-dimethyl-1-hexyn-3-ol, diallyl maleate, dimethyl maleate, bis(2-methoxy-1-methylethyl) maleate, 3,5-dimethyl-3-hexene-1-yne, 3-methyl-3-pentene-1-yne, 3-methyl-3-hexene-1-yne, 1-ethynylcyclohexene, 3-phenyl-3-butene-1-yne, and 1,3,5,7-tetramethyl-1,3,5,7-tetravinylcyclotetrasiloxane.

18. A composition according to claim 14, wherein (D) is selected from the group consisting of 1-ethynyl-1-cyclohexanol, 3-methyl-1-butyn-3-ol, 3-phenyl-1-butyn-3-ol, 3,5-dimethyl-1-hexyn-3-ol, diallyl maleate, dimethyl maleate, bis(2-methoxy-1-methylethyl) maleate, 3,5-dimethyl-3-hexene-1-yne, 3-methyl-3-pentene-1-yne, 3-methyl-3-hexene-1-yne, 1-ethynylcyclohexene, 3-phenyl-3-butene-1-yne, and 1,3,5,7-tetramethyl-1,3,5,7-tetravinylcyclotetrasiloxane.

19. A composition according to claim 15, wherein (D) is selected from the group consisting of 1-ethynyl-1-cyclohexanol, 3-methyl-1-butyn-3-ol, 3-phenyl-1-butyn-3-ol, 3,5-dimethyl-1-hexyn-3-ol, diallyl maleate, dimethyl maleate, bis(2-methoxy-1-methylethyl) maleate, 3,5-dimethyl-3-hexene-1-yne, 3-methyl-3-pentene-1-yne, 3-methyl-3-hexene-1-yne, 1-ethynylcyclohexene, 3-phenyl-3-butene-1-yne, and 1,3,5,7-tetramethyl-1,3,5,7-tetravinylcyclotetrasiloxane.

20. A method of making a silicone composition comprising mixing:

(A)(i) 50 to 80 wt % of a linear trimethylsiloxy-terminated polydiorganosiloxane having a viscosity of 50 to 5000 mm²/s at 25° C. and containing at least 2 alkenyl groups having at least 4 carbon atoms, the alkenyl groups comprising 0.2 to 10.0 mole % of all organic groups bonded to silicon atoms in the polydiorganosiloxane; and (A)(ii) 20 to 50 wt % of a linear dimethylalkenylsiloxy-terminated polydiorganosiloxane having a viscosity of 50 to 5000 mm²/s at 25° C. and containing at least 2 alkenyl groups per molecule, the alkenyl groups comprising 0.2 to 10.0 mole % of all organic groups bonded to silicon atoms in the polydiorganosiloxane;

(B) 3 to 50 parts by weight per 100 parts by weight of Component (A) of a polyorganohydrogensiloxane having at least 3 silicon-bonded hydrogen atoms per molecule and having a viscosity of 1 to 1000 mm$^2$/s at 25° C.;

(C) a catalytic quantity of a platinum catalyst; and (D) an inhibitor;

with the proviso that the silicone composition is solventless.

* * * * *